UNITED STATES PATENT OFFICE.

ALBERT H. WILLIAMS, OF WORCESTER, MASSACHUSETTS, ASSIGNOR TO IONITE STORAGE BATTERY CO., OF WORCESTER, MASSACHUSETTS, A CORPORATION OF MASSACHUSETTS.

NONFLUID ELECTROLYTES FOR STORAGE BATTERIES.

1,403,462.     Specification of Letters Patent.     Patented Jan. 10, 1922.

No Drawing.     Application filed April 27, 1920. Serial No. 377,023.

*To all whom it may concern:*

Be it known that I, ALBERT H. WILLIAMS, a citizen of the United States, and resident of Worcester, county of Worcester, State of Massachusetts, have invented an Improvement in Nonfluid Electrolytes for Storage Batteries, of which the following description is a specification.

This invention relates to improvements in non-fluid, or so-called solid, electrolytes for use in storage batteries of the lead-sulphuric acid type and the general object thereof is to provide a non-fluid electrolyte which will produce a more efficient and economical battery.

In usual lead-sulphuric type of battery the active material of the positive plate, when charged, is substantially pure lead peroxide, ($PbO_2$), and that of the negative plate is sponge lead (Pb). The electrolyte ordinarily used is dilute sulphuric acid desirably having a specific gravity of 1.250. When the battery is discharged the sulphuric acid is decomposed, liberating the sulphuric radical, ($SO_4$) which unites with the lead peroxide to form lead sulphate and at the same time unites with the lead of the negative plate to form lead sulphate, the hydrogen liberated, combining with oxygen simultaneously freed, to form water; the re-action for the positive plate according to well established theory being:—

and that for the negative plate being:—

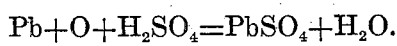

In previous non-fluid lead sulphuric types of batteries the electrolyte has been composed of equal parts of silicate of soda and dilute sulphuric acid which may be stated for illustrative purposes has 100 cubic centimeters of silicate of soda and 100 cubic centimeters of dilute sulphuric acid. The silicate of soda offers a high electrical resistance in the battery, and consequently reduces its efficiency to such an extent that such batteries having non-fluid or solid electrolytes have been found impracticable particularly where heavy currents are required as in batteries used for actuating self-starters for automobiles.

One of the objects of the present invention is to provide a non-fluid electrolyte comprising constituents which have a minimum electrical resistance.

Another object of the invention is to employ an agent or agents for congealing the silicate of soda to a non-fluid or gelatinous form which will decompose during the discharge of the battery to free the sulphuric radical, ($SO_4$) necessary to form the lead sulphate which accumulates upon both the positive and negative plates during the discharge of the battery.

Another object of the invention is to provide an electrolyte having constituents which will produce a minimum amount of insoluble sulphates, thus reducing or eliminating the "sulphating" of the plates which usually causes serious deterioration of the battery.

Another object of the invention is to provide an electrolyte comprising a material which, by absorption of moisture from the atmosphere, will prevent the electrolyte from becoming crystalline or granular and preserve it in a gelatinous or jelly-like form, this preferably being accomplished by adding to the electrolyte a predetermined amount of glycerine which is chemically neutral and offers little or no electrical resistance.

Another object of the invention is to provide an electrolyte comprising agents which will reduce to a minimum the local electric action of the battery and which will also minimize polarization.

A further feature of the invention consists in providing an electrolyte comprising constituents which will absorb the gases which are produced during the decomposition of the electrolyte and thereby reduce to a minimum, or eliminate, the accumulation of gases upon the plates, which in usual batteries offer such electrical resistance as to decrease the efficiency of the battery.

Other objects and features of the invention will more fully appear from the following description and will be pointed out in the annexed claims.

While the electrolyte forming the subject matter of this invention is adapted to be used in any storage battery of the lead-sulphuric-acid type, it is most effectively used in batteries comprising plates in which the active elements are originally formed from fibrous sponge lead suitably compressed into a desired form and in which the lead peroxide in the negative plate is produced by electrolytic action upon the pure fibrous sponge lead as disclosed in my co-pending application No. 374,360 filed April 16, 1920; since by the method described in said application both positive and negative plates of greater purity are produced than by the usual processes for forming plates in which the active material for the positive plate is produced from a "paste" and the negative plate formed of sponge lead of granular instead of fibrous form.

In the production of the electrolyte forming the subject matter of this invention a decreased amount of silicate of soda is employed by the use of a sulphate capable of decomposing during the action of the battery to free the sulphuric radical, ($SO_4$), which unites with the lead peroxide of the positive plate and the lead of the negative plate to form lead sulphate. Various sulphates may be used for this purpose, preferably however, neutral mineral sulphates such as magnesium sulphate, ($MgSO_4$), may be employed in substantial proportions. By the use of magnesium sulphate much less silicate of soda is required to form a desired gelatinous non-fluid electrolyte and the electrical resistance of the gelatinous composition is very much less than that which is produced by the action of sulphuric acid directly upon silicate of soda.

I have discovered that by the use of magnesium sulphate and per-sulphuric acid in combination with dilute sulphuric acid of a specific gravity of 1.500, the sodium silicate required to form a non-fluid electrolyte may be reduced from 50% to approximately 5%, from 12 to 15% of magnesium sulphate being employed together with from 12 to 15% of per-sulphuric acid and substantially 50% of dilute sulphuric acid, the remainder of the electrolyte consisting of water, or preferably of water and glycerine.

In the production of the electrolyte forming the subject matter of this invention I have preferably employed a per-sulphuric acid of the tionic series in addition to, or replacement of, a certain amount of the dilute sulphuric acid employed. The per-sulphuric acid thus employed is itself a relatively good electrical conductor. It serves to digest the silicate of soda and thus aids in the formation of the gelatinous non-fluid electrolyte and also during the action of the battery is decomposed to free the sulphuric radical ($SO_4$) which acts upon the plates of the battery. The proportions of per-sulphuric acid thus employed may be varied as may be required by the relative proportions of the other ingredients of the electrolyte. I have, however, found that from 10 to 15% of per-sulphuric acid may be satisfactorily used.

I desirably employ in addition to the ingredients of the electrolyte above mentioned a substance, such as glycerine, which is capable of absorbing moisture from the atmosphere to replace the water which is decomposed under the electrolytic action of the current which occurs during the charging of the battery. By thus replacing in the battery the water which has been decomposed by the electrical current the electrolyte is preserved in a gelatinous form and prevented from becoming crystalline or almost granular in form which condition has been observed in non-fluid batteries heretofore constructed after the charging operation has been completed. Glycerine thus employed also has the further property of absorbing a vast amount of the gases which are produced during the action of the battery thereby preventing the accumulation of such gases upon the plates of the battery, or in the interstices in the active material of said plates. Thus the efficiency of the battery is still further increased.

It has been found that from 12 to 15% of glycerine may be satisfactorily employed in an electrolyte comprising the ingredients in the proportions above mentioned, but it will be understood that the amount of glycerine may be varied in correlation to the other ingredients of the electrolyte.

Briefly summarized, by way of example it may be stated that in place of using 100 cubic centimeters of silicate of soda and 100 cubic centimeters of dilute sulphuric acid of a specific gravity of 1.250 a preferred electrolytic composition may comprise:—

10 cubic centimeters sodium silicate, 25 cubic centimeters per-sulphuric acid, 50 cubic centimeters dilute sulphuric acid, specific gravity 1.500, 25 cubic centimeters magnesium sulphate, 25 cubic centimeters glycerine, 90 cubic centimeters water.

It has been found that an electrolyte formed from these chemicals, in approximately the proportions stated, substantially or entirely avoids the formation of insoluble sulphates and that there is little or no local action produced when the same is used in a battery containing plates formed in accordance with the process set forth in my application aforesaid; that whereas with usual types of batteries the sulphuric acid causes local action which will greatly reduce the efficiency of the electrolyte within a relatively short time when the battery is left on open circuit, a battery having such plates and the electrolyte herein described may be left on open circuit for an indefinite period without any material decrease in the efficiency of the battery. It is further found that the absorption of moisture from the atmosphere by the glycerine is sufficient to maintain the electrolyte in a gelatinous form and in a substantially perfect state of preservation both during the use of the battery in charging and discharging as well as when the battery is lying idle upon open circuit.

By reason of the reduction of internal resistance of the battery a higher voltage is produced and maintained during discharging of the battery than is attained in usual lead sulphuric acid batteries, and the capacity of the battery in ampere hours is correspondingly increased.

For like reasons the battery is enabled to be charged with much greater rapidity without injury to the plates and without material loss of the essential constituents of the electrolyte.

It will be understood that my invention is not restricted to the preferred electrolytic composition which is specifically disclosed herein, or to the particular ingredients which are specifically mentioned, and that other portions and other ingredients having the same or like properties may be substituted for those herein specifically mentioned and described. For example, instead of magnesium sulphate, sodium sulphate might be used, but in such instance it is found that a greater amount of silicate is required to form a proper gelatinous composition.

While preferably neutral mineral sulphates are used, it will be understood that metal sulphates may also be employed within the spirit and scope of my invention.

Having thus described my invention, what I claim as new and desire to secure by Letters Patent, is:

1. A non-fluid electrolyte comprising silicate of soda, a sulphate capable under electrolytic action of liberating its sulphuric radical and sulphuric acid.

2. A non-fluid electrolyte comprising silicate of soda, a neutral mineral sulphate and sulphuric acid.

3. A non-fluid electrolyte comprising silicate of soda, sulphate of magnesium and sulphuric acid.

4. A non-fluid electrolyte comprising silicate of soda, a sulphate capable under electrolytic action of liberating its sulphuric radical, and a per-sulphuric acid of the tionic series.

5. A non-fluid electrolyte comprising silicate of soda, a sulphate capable under electrolytic action of liberating its sulphuric radical, a per-sulphuric acid of the tionic series, and dilute sulphuric acid.

6. An electrolyte containing sodium silicate and having substantially equal portions of magnesium sulphate and per-sulphuric acid.

7. A non-fluid electrolyte comprising the following ingredients in substantially the proportions specified, 10 cubic centimeters sodium silicate, 25 cubic centimeters per-sulphuric acid, 50 cubic centimeters dilute sulphuric acid, 25 cubic centimeters magnesium sulphate, 25 cubic centimeters glycerine, 90 cubic centimeters water.

8. A non-fluid electrolyte comprising sodium silicate, sulphuric acid and a chemically neutral substance capable of absorption of moisture from the air adapted to replace the water decomposed by electrolytic action in the battery.

9. A non-fluid electrolyte comprising sodium silicate, a sulphate capable under electrolytic action of liberating its sulphuric radical, and glycerine.

10. A non-fluid electrolyte comprising sodium silicate, a mineral sulphate, sulphuric acid and glycerine.

11. A non-fluid electrolyte comprising sodium silicate, magnesium sulphate, a per-sulphuric acid of the tionic series, dilute sulphuric acid and glycerine.

In testimony whereof, I have signed my name to this specification.

ALBERT H. WILLIAMS.